United States Patent [19]

Nami et al.

[11] Patent Number: 5,162,860
[45] Date of Patent: Nov. 10, 1992

[54] COLOR IMAGE FORMING APPARATUS CONTROLLING GLOSSINESS OF AN IMAGE

[75] Inventors: Yasuo Nami, Kawasaki; Hisashi Fukushima, Yokohama; Haruhiko Moriguchi, Yokohama; Takashi Kawai, Yokohama; Takahiro Kubo, Tokyo; Nobuatsu Sasanuma, Yamato, all of Japan

[73] Assignee: Canon Kabushiki Kaisha, Tokyo, Japan

[21] Appl. No.: 799,333

[22] Filed: Nov. 27, 1991

[30] Foreign Application Priority Data

Nov. 30, 1990 [JP] Japan .................. 2-329729
Nov. 30, 1990 [JP] Japan .................. 2-329730
Nov. 30, 1990 [JP] Japan .................. 2-329731
Oct. 30, 1991 [JP] Japan .................. 3-311790

[51] Int. Cl.$^5$ ............................. G03G 15/01
[52] U.S. Cl. ......................... 355/327; 358/75
[58] Field of Search ............... 358/75; 355/326, 327, 355/245, 246, 251; 118/653, 657

[56] References Cited

U.S. PATENT DOCUMENTS

| | | | |
|---|---|---|---|
| 4,436,410 | 3/1984 | Komiya | 355/327 X |
| 4,578,331 | 3/1986 | Ikeda et al. | 355/327 X |
| 4,580,889 | 4/1986 | Hiranuma et al. | 355/327 |
| 5,030,539 | 7/1991 | Kintz et al. | 430/138 |

Primary Examiner—A. T. Grimley
Assistant Examiner—Sandra L. Brasé
Attorney, Agent, or Firm—Fitzpatrick, Cella, Harper & Scinto

[57] ABSTRACT

A color image forming apparatus comprising: an input device for inputting image signals denoting a plurality of color components; an under color processing device for processing the under colors of the image signals denoting a plurality of the color components supplied by the input device; an image forming device for forming images in response to the image signals denoting a plurality of the color components, which have been processed by the under color processing device, and image signals denoting the under colors by using coloring agents which correspond to a plurality of the color components and the under colors, the coloring agents, which correspond to the under colors, having glossiness lower than that of the coloring agents which correspond to a plurality of the color components; and a control device for controlling the glossiness of the image formed by the image forming device by controlling the quantity of process of the under colors processed by the under color processing device.

15 Claims, 16 Drawing Sheets

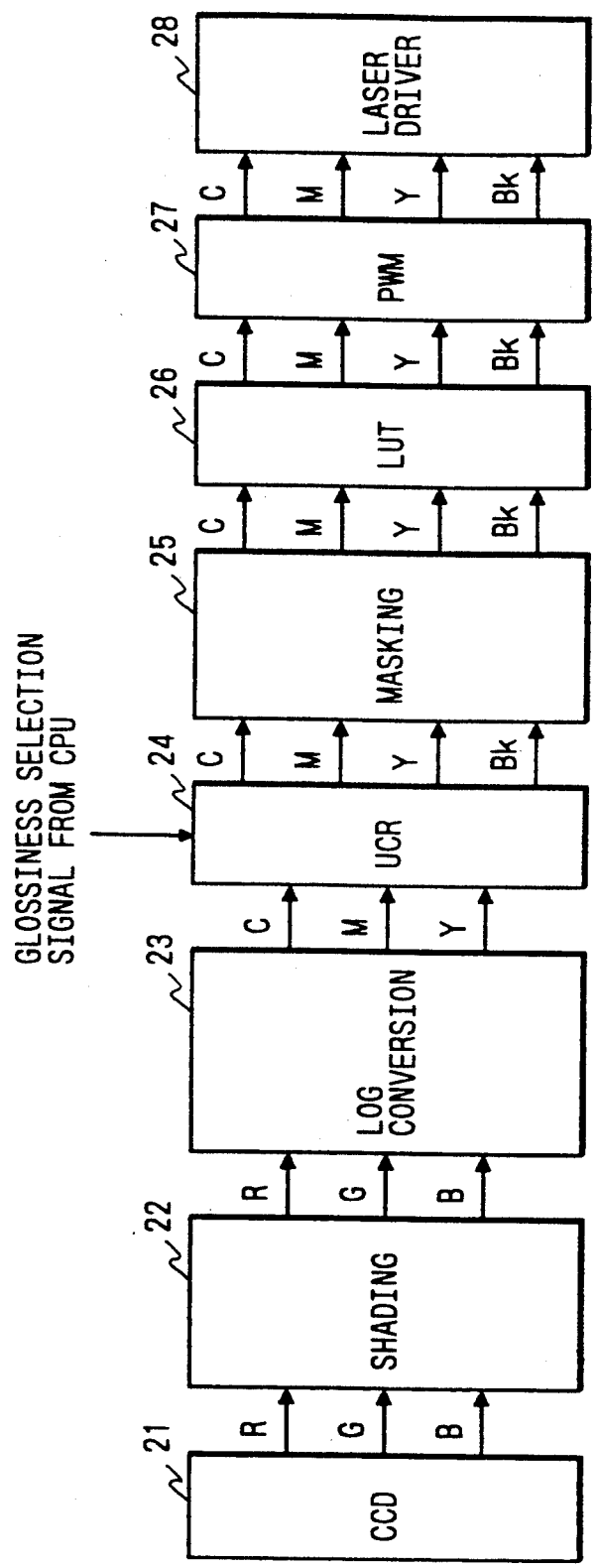

FIG. 10

$$\begin{bmatrix} 0 & 0 & 0 & 0 \\ 0 & 0 & 0 & 0 \\ 0 & 0 & 0 & 0 \\ 0 & 0 & 0 & 0 \end{bmatrix} \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

$$\begin{bmatrix} 1 & 1 & 1 & 1 \\ 1 & 1 & 1 & 1 \\ 0 & 0 & 0 & 0 \\ 0 & 0 & 0 & 0 \end{bmatrix} \begin{bmatrix} 0 & 0 & 0 & 0 \\ 0 & 0 & 0 & 0 \\ 1 & 1 & 1 & 1 \\ 1 & 1 & 1 & 1 \end{bmatrix} \begin{bmatrix} 1 & 1 & 0 & 0 \\ 1 & 1 & 0 & 0 \\ 1 & 1 & 0 & 0 \\ 1 & 1 & 0 & 0 \end{bmatrix} \begin{bmatrix} 0 & 0 & 1 & 1 \\ 0 & 0 & 1 & 1 \\ 0 & 0 & 1 & 1 \\ 0 & 0 & 1 & 1 \end{bmatrix}$$

$$\begin{bmatrix} 1 & 1 & 0 & 0 \\ 1 & 1 & 0 & 0 \\ 0 & 0 & 0 & 0 \\ 0 & 0 & 0 & 0 \end{bmatrix} \begin{bmatrix} 0 & 0 & 1 & 1 \\ 0 & 0 & 1 & 1 \\ 0 & 0 & 0 & 0 \\ 0 & 0 & 0 & 0 \end{bmatrix} \begin{bmatrix} 0 & 0 & 0 & 0 \\ 0 & 0 & 0 & 0 \\ 1 & 1 & 0 & 0 \\ 1 & 1 & 0 & 0 \end{bmatrix} \begin{bmatrix} 0 & 0 & 0 & 0 \\ 0 & 0 & 0 & 0 \\ 0 & 0 & 1 & 1 \\ 0 & 0 & 1 & 1 \end{bmatrix}$$

$$\begin{bmatrix} 1 & 1 & 1 & 1 \\ 0 & 0 & 0 & 0 \\ 1 & 1 & 1 & 1 \\ 0 & 0 & 0 & 0 \end{bmatrix} \begin{bmatrix} 0 & 0 & 0 & 0 \\ 1 & 1 & 1 & 1 \\ 0 & 0 & 0 & 0 \\ 1 & 1 & 1 & 1 \end{bmatrix} \begin{bmatrix} 1 & 0 & 1 & 0 \\ 1 & 0 & 1 & 0 \\ 1 & 0 & 1 & 0 \\ 1 & 0 & 1 & 0 \end{bmatrix} \begin{bmatrix} 0 & 1 & 0 & 1 \\ 0 & 1 & 0 & 1 \\ 0 & 1 & 0 & 1 \\ 0 & 1 & 0 & 1 \end{bmatrix}$$

$$\begin{bmatrix} 0 & 0 & 1 & 1 \\ 0 & 0 & 1 & 1 \\ 1 & 1 & 1 & 1 \\ 1 & 1 & 1 & 1 \end{bmatrix} \begin{bmatrix} 1 & 1 & 0 & 0 \\ 1 & 1 & 0 & 0 \\ 1 & 1 & 1 & 1 \\ 1 & 1 & 1 & 1 \end{bmatrix} \begin{bmatrix} 1 & 1 & 1 & 1 \\ 1 & 1 & 1 & 1 \\ 0 & 0 & 1 & 1 \\ 0 & 0 & 1 & 1 \end{bmatrix} \begin{bmatrix} 1 & 1 & 1 & 1 \\ 1 & 1 & 1 & 1 \\ 1 & 1 & 0 & 0 \\ 1 & 1 & 0 & 0 \end{bmatrix}$$

FIG. 21
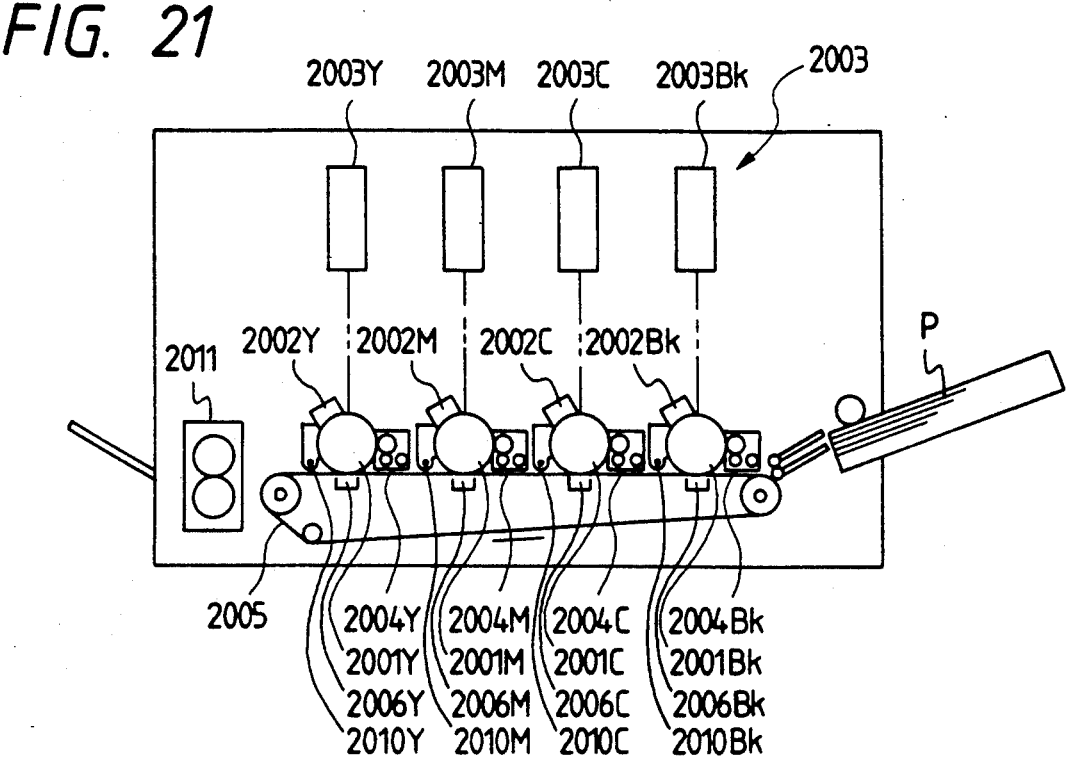
FIG. 22
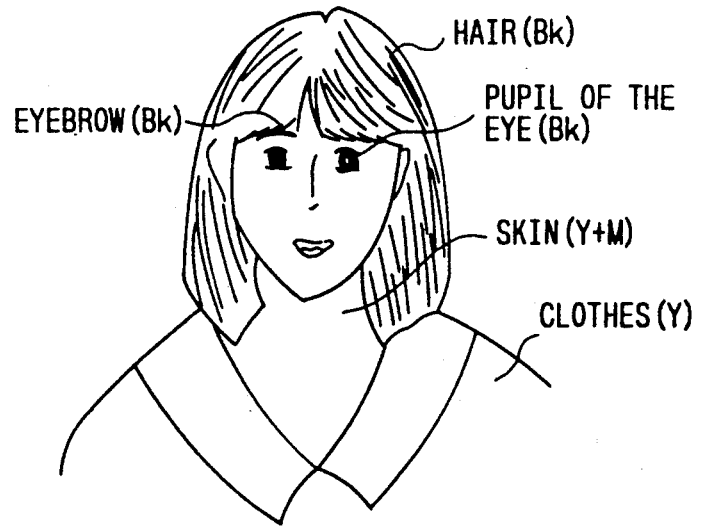
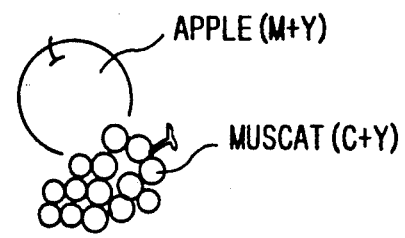

COLOR IMAGE FORMING APPARATUS CONTROLLING GLOSSINESS OF AN IMAGE

BACKGROUND OF THE INVENTION

1. Field of the Invention

The present invention relates to a color image forming apparatus for forming a color image by mixing a plurality of coloring agents.

2. Related Background Art

Hitherto, a conventional electrophotographic color image forming apparatus formed a color image by a method comprising the steps of: a latent image forming process in which a color image, the color of which has been decomposed into four colors, that is, yellow, magenta, cyan and black, is exposed and formed on the surface of an image carrier such as a photosensitive drum, which has been uniformly charged, by a laser beam serving as an exposure means according to the present invention; a development process for developing the latent image formed on the photosensitive drum into a toner image (a visible image); a transfer process for transferring the toner image formed on the photosensitive drum to the surface of recording paper; and a fixing process for fixing the toner image formed on the recording paper.

For example, an electrophotographic color copying machine serving as an application example of the color image forming apparatus according to the present invention reads an original color image while decomposing the color into three colors, that is, red (R), green (G) and blue (B) and they are color-converted into CMY density signals, which are the complementary signals of RGB so that a color signal of the subtractive mixture type which uses toner is obtained.

Usually, a black (BK) signal is formed in addition to the YMC density signals so that the image is formed by using color toners of four colors, that is, yellow, magenta, cyan and black. That is, the black toner is used to perform the under color removal in which black realized by toner is employed in place of black obtained from the YMC three-color mixture. When the under color removal is performed by using the black toner, it is considered that the following effects can be obtained:

(1) The density reproducibility in the high density image portion can be improved.

(2) The color reproducibility in a colorless image region can be stabilized.

(3) The sharpness of the image can be improved.

(4) The running cost can be reduced because the quantity of the consumption of the toner can be reduced.

In order to further improve the above-described effects (1), (2) and (3), a method has been ordinarily employed in which the black toner is made to form the uppermost layer of the formed image.

On the other hand, in an office, a color copying machine has been used not only to copy a color original document but also used to copy a white and black image. Therefore, the color copying machine must be able to function as the conventional white and black copying machine and as well as have excellent cost performance. Therefore, the toner for the conventional white and black copying machine is sometimes used because of its advantage of the low cost in comparison to that of the color toner.

However, there arises a problem in that, when the black toner for the white and black copying machine is used in the color copying machine in such a manner that it is placed at the uppermost layer of the formed image, the glossiness of the surface of the color region and that of the colorless region become different from each other on the same image and thereby a person who observes the image feels strange.

For example, when a full color human figure or an image of a fruit as shown in FIG. 22 is color-reproduced in such a manner that the skin (Y+M), the clothes (Y), an apple (M+Y) and a muscat (C+Y) are respectively reproduced by using the color toners, the surface of each of the images formed by the above-described color toners displays a high glossiness. However, the images of the hair, the pupil of the eye and the eyebrow formed by the black toner display insufficient glossiness. As a result, the glossiness of each of the color regions and that of each of the colorless regions become different from one another at the surface thereof. In particular, since a severe evaluation is usually made about the image of a human figure, the quality of the image becomes unsatisfactory for a user.

The reason why the above-described uneven glossiness takes place will now be described briefly. It is preferable that the toner has a low melting point (140° to 150° C.) so as to be dissolved and mixed with other color toners in order to improve the color reproducibility of a color image. On the other hand, a black toner for use in a conventional white and black copying machine is arranged to possess a high melting point (180° to 190° C.) for the purpose of raising the copying speed and improving the durability because of its high frequency in use.

Therefore, although the color toners can be dissolved by heat in the fixing process in which the toners are fixed to a recording paper sheet, the black toner cannot be satisfactorily dissolved. As a result, the colorless black toner image regions involve uneven portions on their surfaces in a microscopic view. Therefore, light made incident upon the paper surface can be diffused and reflected, causing the glossiness of the surface of the image to be deteriorated. On the other hand, the surface of the image region formed by the color toners is smooth enough to regularly reflect light made incident upon the surface of the paper. As a result, the above-described region displays excellent glossiness.

Hitherto, there has been suggested a method of changing the glossiness of a formed image in such a manner that the temperature of the fixing roller is changed. Another method has been disclosed in which the speed of the fixing roller is changed.

Each of the above-described two methods is arranged in such a manner that the heating value to be given to the toner is changed to adjust the degree at which the toner is melted so as to change the surface condition of the image. Thus, the glossiness is changed.

However, the above-described methods are necessarily arranged in such a manner that the essential factors for forming the image, such as the color mixture characteristics and fixing characteristics, are changed undesirably. Therefore, an image exhibiting excellent quality cannot be obtained because the glossiness, the color tone and adhesive force can be changed. Furthermore, since the fixing process is performed in a state where the fixing conditions are not suitable for the life of the fixing roller, the fixing roller can easily be deteriorated.

The conventional full color copying machine has been arranged in such a manner that the melting points of the magenta, cyan, yellow and black toners are made to be closer to one another as much as possible to prevent the undesirable change in the glossiness of one color.

However, the melting point of the black toner for use in the above-described conventional color copying machine is lower than that of the toner for use in the ordinary monochromatic copying machine. Therefore, the glossiness of the black image, for example, that of a black line image such as a black character, is raised excessively. Therefore, there arises a problem in that the formed image cannot easily be recognized depending upon the way of placing the light source for use to observe the formed image.

Furthermore, in a full color copying machine or the like, the four color decomposition algorithm for obtaining chromaticity (color tone) required by a user has different optimum value which is determined depending upon the type and the characteristics of the recording medium such as the surface flatness, the chromaticity and the whiteness of the recording medium and as well as a fact that the recording medium is used to form a transparent image or a reflected image. Therefore, images exhibiting high quality cannot always be obtained regardless of the type of the recording medium. Furthermore, in order to obtain an image (hereinafter called an "OHP image") for use in an over head projector, the image must have high transparency. Accordingly, there arises a problem in that, if the transparency of each of the toner images is different depending upon the hue, any means capable of overcoming this fact must be provided in order to obtain an image exhibiting high quality.

SUMMARY OF THE INVENTION

An object of the present invention is to provide a color image forming apparatus capable of overcoming the above-described problems.

Another object of the present invention is to provide a color image forming apparatus capable of forming a glossy image while using cheap coloring agents.

Another object of the present invention is to provide a color image forming apparatus capable of forming an image having desired glossiness by adjusting the quantity of a coloring agent of a predetermined color.

Another object of the present invention is to provide a color image forming apparatus capable of forming an image exhibiting high quality by changing the glossiness of the image in accordance with the tone image region and the line image region.

Another object of the present invention is to provide a color image forming apparatus capable of always stably forming a color image by determining the algorithm for converting the original image into image signals for each color in accordance with the characteristics of the recording medium.

Another object of the present invention is to provide a color image forming apparatus capable of forming an image having desired glossiness by performing an image forming process in which a coloring agent having low glossiness is used before an image forming process in which a coloring agent having high glossiness is used is performed.

Other and further objects, features and advantages of the invention will be appear more fully from the following description.

BRIEF DESCRIPTION OF DRAWINGS

FIG. 3 is a block diagram which illustrates a processing circuit for processing image signals;

FIG. 10 illustrates an example of a matrix for discriminating the character and line images;

FIG. 21 is a cross sectional structural view which illustrates another embodiment of the color image forming apparatus; and FIG. 22 illustrates the glossiness of a formed image after a color image has been formed.

DETAILED DESCRIPTION OF PREFERRED EMBODIMENTS

Preferred embodiments will now be described.

According to this embodiment, a magenta toner was employed which was composed of 100 parts by weight of polyester main binder, 4 parts by weight of C.I. solvent red 49 serving as a pigment, 0.7 parts by weight of C.I. pigment red 122 serving as a dyestuff, 4 parts by weight of a charge controller and an additive. A cyan toner was composed of 100 parts by weight of polyester main binder, 5 parts by weight of phthalocyanine pigment, 4 parts by weight of a charge controller and an additive. A yellow toner was composed of 100 parts of polyester main binder, 5 parts by weight of C.I. pigment yellow 17, 4 parts of a charge controller and an additive. A black toner was composed of 100 parts by weight of polyester main binder, 60 parts by weight of a magnetic material, 2 parts by weight of a charge controller, 3 parts of a fixing agent and an additive.

A fixing apparatus comprised of a pair composed of a fixing roller made of silicone rubber and a pressure roller arranged in such a manner that silicone rubber is coated with fluororubber. The temperature of the surface of the roller was made to be 180° C.

Figure 1:
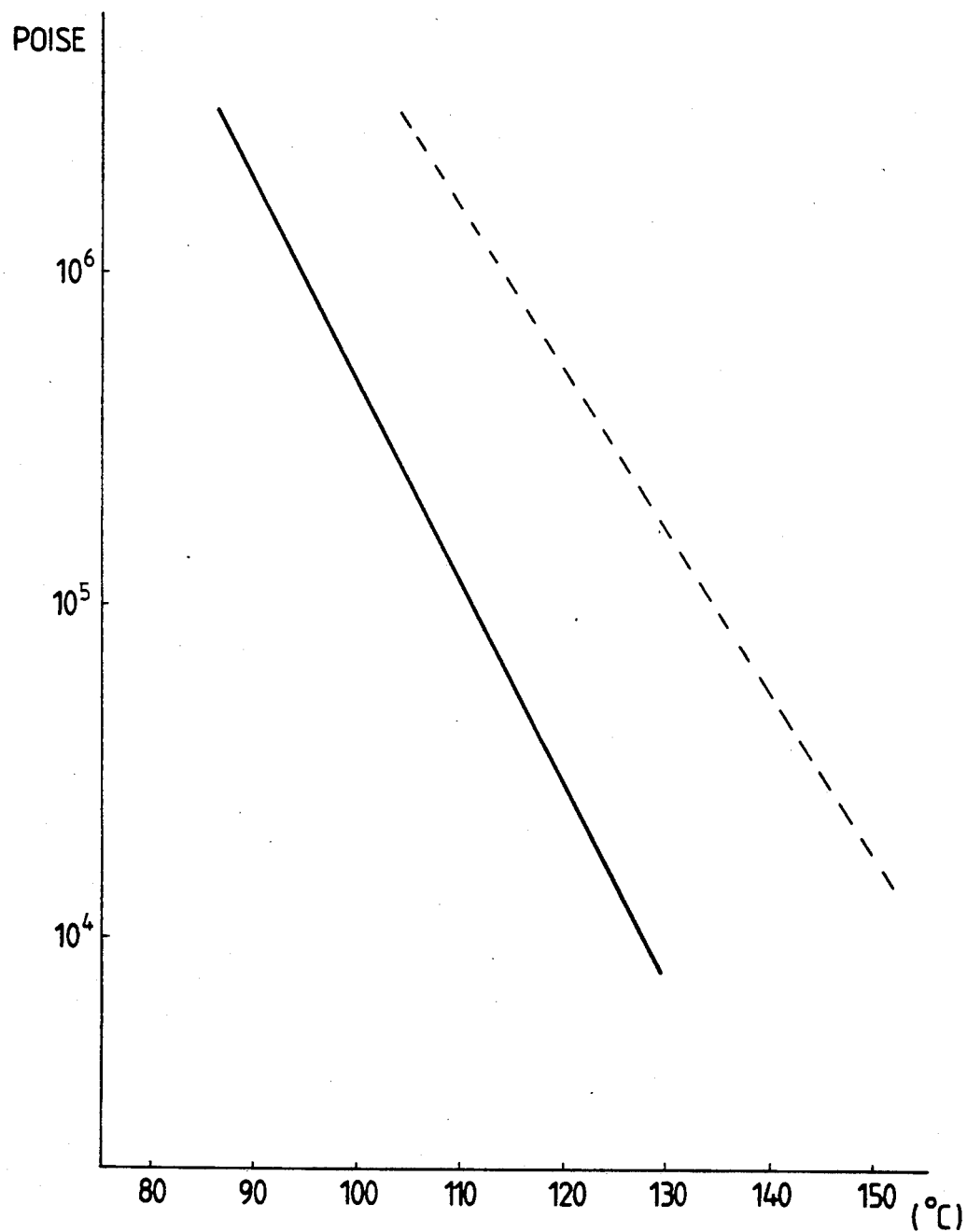
FIG. 1 illustrates the characteristics of the viscosity depending upon the temperature of a toner for use in an embodiment of the present invention.

The temperature and the viscosity characteristics of the above-described magenta toner, cyan toner and the yellow toner were arranged as designated by a continuous line of FIG. 1. The temperature and the viscosity characteristics of the black toner were arranged as designated by a dashed line of FIG. 1.

The softening point of the toner according to this embodiment was made to be a temperature at which the viscosity was made to be $10^5$ poise.

The melting point of the magenta, the cyan and the yellow toners was 110° C., while that of the black toner was 135° C.

Figure 2:
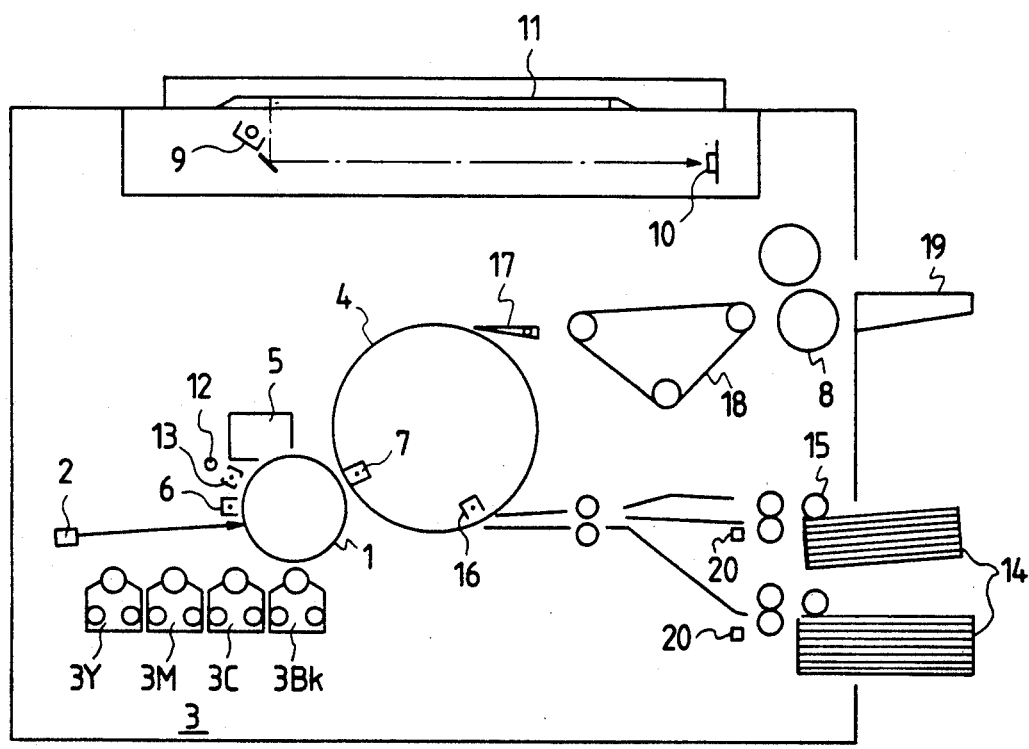
FIG. 2 is a schematic cross sectional view which illustrates the internal structure of an embodiment of an image forming apparatus according to the present invention.

FIG. 2 is a cross sectional view which schematically illustrates the structure of an embodiment of a full color copying apparatus according to the present invention.

Referring to FIG. 2, an original document 11 is exposed to light of an exposure lamp 9 so that reflected light from the same is imaged on an image sensor 10 comprising, for example, a CCD. The image sensor 10 has red, green and blue color filters fitted thereto so that red, green and blue image signals are transmitted. The image signals are then converted into image signals corresponding to cyan, yellow, magenta and black by a circuit to be described later.

The surface of the photoconductive photosensitive drum 1 is exposed to a laser beam emitted from a laser beam scanner 2 and modified in accordance with each image signal. A latent image formed on the surface of the photosensitive drum 1 is sequentially developed by a development device 3 by C (cyan), M (magenta), Y (yellow) and BK (black) toners. The toner images obtained by the development process are sequentially transferred to the surface of a recording medium 14 electostatically absorbed/secured to the surface of a transfer drum 4. Then, the above-described recording medium 14 is separated by a scraping claw 17 before it is exhaused onto the surface of an exhaust tray 19 after it has passed through a conveyance belt 18 and a fixing roller 8.

Referring to FIG. 2, reference numeral 3BK represents a black image developer, 3Y represents yellow image developer, 3M represents a magenta image developer and 3C represents a cyan image developer. Reference numeral 5 represents a cleaner, 6 represents a primary charger, 7 represents a transfer charger, 12 represents a pre-exposure lamp and 13 represents a discharger.

FIG. 3 is a block diagram which illustrates an image signal processing circuit for forming a digital full color image.

R (red), G (green) and B (blue) image brightness signals (RGB brightness signal) read by a CCD 21 (which corresponds to the element 10 shown in FIG. 2) are subjected to a process in which scatter between the light receiving cells (between pixels) is corrected by a shading correction circuit 22.

Then, a LOG conversion circuit 23 converts the RGB brightness signals supplied from the shading correction circuit 22 into C (cyan), M (magenta) and Y (yellow) image density signals.

In a UCR (Under Color Removal) circuit 24 to which the image density signals are supplied from the LOG conversion circuit 23, a process is performed in which a black component formed by mixing the C, M and Y toners is replaced by the BK (black) toner in a case of a low brightness color, that is, in a case of a color signal inclined toward black. The above-described UCR process is also called "black color generation".

The UCR circuit 24 enables the quantity of the toner to be reduced and reproducibility of a pure black image which cannot easily be obtained by mixing C, M and Y to be improved by using the exclusive black (BK) toner.

A masking circuit 25 which receives the C, M, Y and BK signals supplied from the UCR circuit 24 converts the C, M, Y and BK signals to adapt to the color reproduction characteristics of the printer. Furthermore, a look-up (LUT) table 26 comprising a ROM converts the same to adapt to the tone characteristics of the printer. Then, a pulse width modulation (PWM) circuit 27 converts them into a pulse width signal which correspond to the density for expressing the density by an area tone method. The pulse width signal thus-formed is supplied to a laser drive 28 so that the surface of the photosensitive drum is scanned and exposed to the laser beam. As a result, the latent image is formed. Furthermore, the UCR circuit 24 receives a glossiness selection signal supplied from a CPU (omitted from illustration) so that the quantity of UCR to be performed in the UCR circuit 24 is controlled, the glossiness selection signal being a signal transmitted from the CPU in response to a command issued from a manipulating portion (omitted from illustration).

Then, the latet images are developed by the corresponding color toner development devices which correspond tot he color latent images in accordance with a conventional electrophotography process. The color toner images are transferred to the surface of the recording medium in a multiplied manner before the transferred images are fixed so that a full color image is formed.

According to this embodiment, the rate of black color generation in the UCR process is adjusted by using the above-described toners, the fixing devices and the image processing means so that the glossiness of the image formed on the recording medium is changed. Furthermore, the fixing device composed of a pair of rollers is used to perform fixing under the same condition.

Figure 4A:
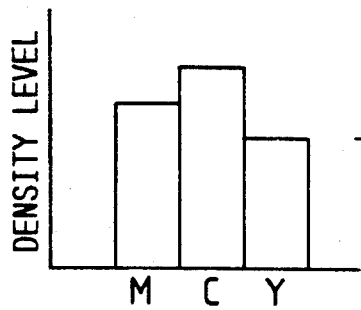
FIGS. 4A to 4E illustrate rates of black color generation for output images.

FIG. 4A illustrates the level of the density signals for a pixel of the original document after it has been LOG-converted.

Figure 4B:
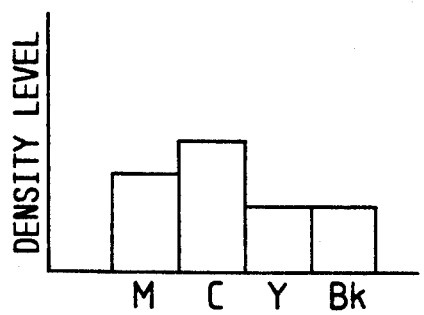
Figure 4C:
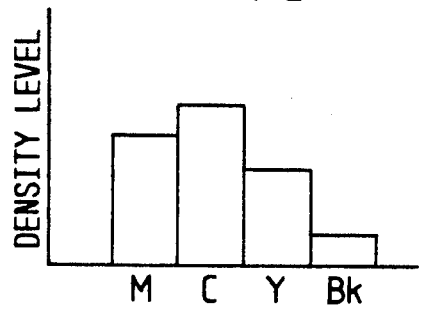
Figure 4D:
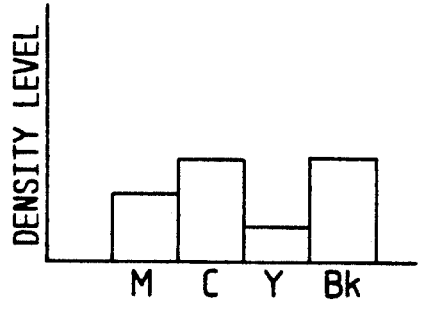
Figure 5:
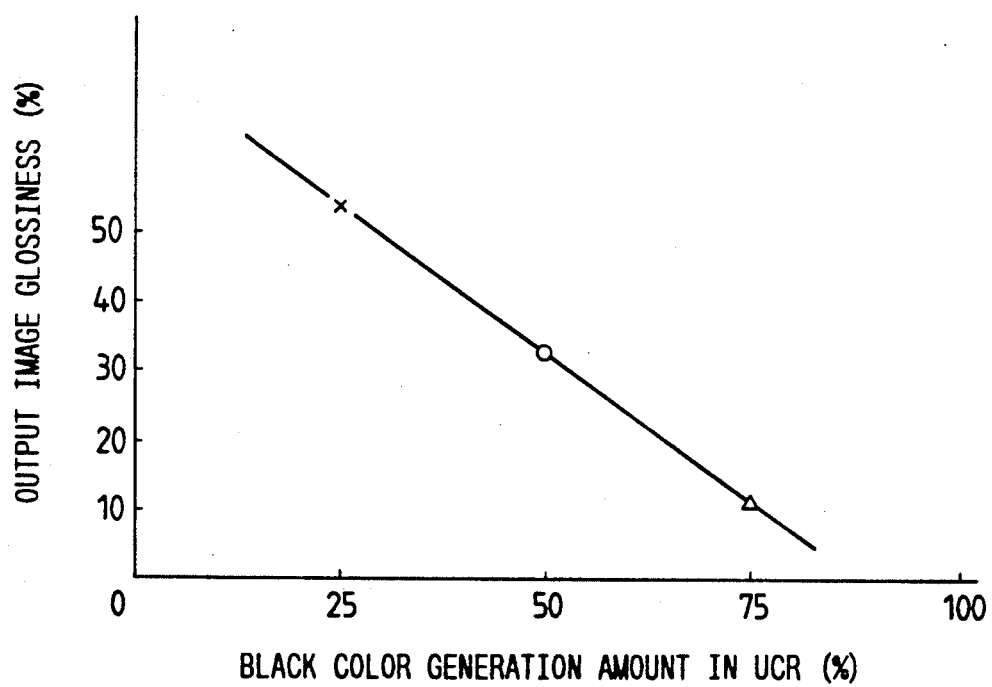
FIG. 5 illustrates change in the glossiness of an output image depending upon the rate of black color generation.

FIG. 4B illustrates the level of the density signals which has been subjected to 50%-black color generation (the UCR process). The glossiness of the full color image formed on the recording medium after it has been subjected to the black color generation at the above-described rate shown in FIG. 4B was 33% under the fixing condition according to this embodiment. Furthermore, the glossiness of the full color image formed on the recording medium after it has been subjected to the black color generation at a rate of 25% shown in FIG. 4C was 54%. In addition, the glossiness of the full color image formed on the recording medium after it has been subjected to the black color generation at a rate of 75% shown in FIG. 4D was 11%. The above-described phenomenon can be considered that the black toner which forms the final layer, in accordance with its quantity, adjusts the glossiness of each of the other three color toners because the black toner has higher softening point than those of the other three toners. According to this embodiment, the above-described three points were selected to determine the rate of black color generation. However, it can be gradually adjusted by determining the rate of black color generation as shown in FIG. 5. According to the above-described image forming apparatus, a glossiness required by a user can be set while maintaining the degree of fixing and the color grade. In addition, the deterioration in the fixing roller can be prevented and thereby an excellent image can be obtained. In order to obtain the above-described effect, it is preferable that the softening point of the black toner be higher than that of each of the other three color toners by 10° C. or more.

Figure 4E:
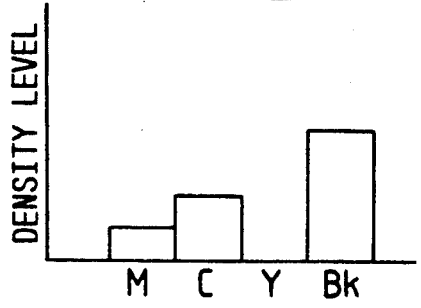

When the conventional UCR process (the rate of black color generation of 100%) as shown in FIG. 4E is performed, a rough image can be formed if a black toner having a small glossiness is used. However, by reducing the quantity of the rate of black color generation, the portion of the black image formed by the Y, M and C toners can be increased and thereby an image exhibiting sufficient glossiness can be formed.

Then, a second embodiment of the present invention will now be described.

According to this embodiment, the toner fixing device and the image processing means according to the first embodiment are used. Furthermore, a glossiness meter is used for the purpose of reading the glossiness of the original image region at the time of reading the original document. Then a CPU adjusts the rate of black color generation in accordance with the measured value of the glossiness. The rate of the black color generation is selected from the glossiness of the output image shown in FIG. 5. As a result, the same glossiness as that of the original document can be reproduced so that an image further like the original document can be formed in comparison to the case where the glossiness is simply selected. The above-described method may, of course, be employed together with the function of selecting the glossiness. As a result, the glossiness of the original document can be reproduced and a further excellent image quality can be obtained.

Then, a third embodiment of the present invention will now be described.

According to this embodiment, the toner, the fixing devices and the image processing means are employed and the rate of the black color generation in the UCR process is adjusted by the density of the color.

Figure 6:
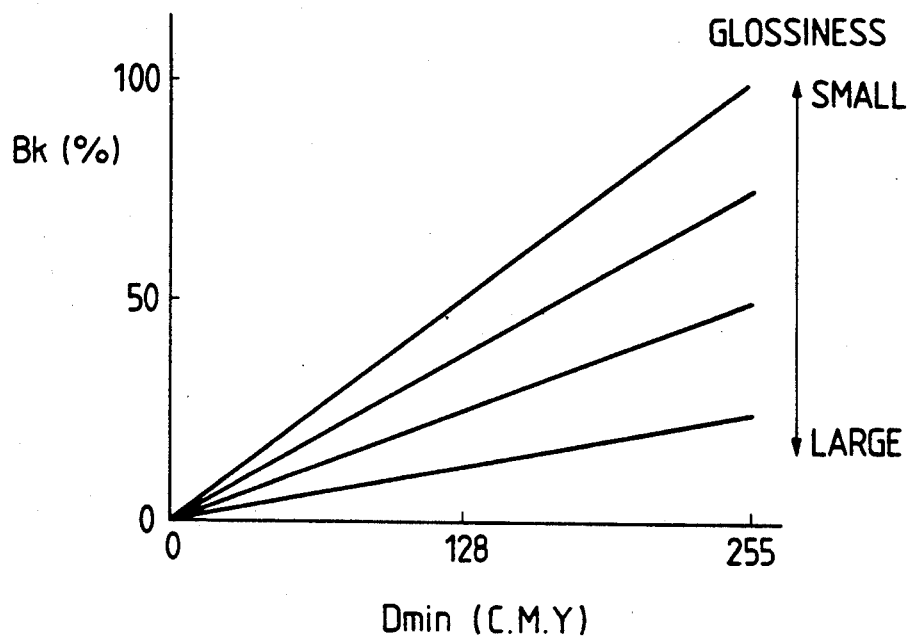
FIG. 6 illustrates UCR characteristics when the rate of black color generation is linearly changed with respect to the color density.

FIG. 6 illustrates an example of the rate of the black color generation in the UCR process.

The axis of abscissa stands for the minimum level value of the C, M and Y density level after the LOG conversion. According to this embodiment, the levels are sectioned in units of 8 bits.

The axis of ordinate stands for the percentage of the rate of the black color generation with respect to the above-described level. In the case shown in FIG. 6, the rate of black color generation is made to be constant regardless of the density of the color. Furthermore, the glossiness can be changed by changing the rate of the black color generation.

However, if the rate of black color generation is linearly determined as described above, the reproducibility of the color displaying high lightness and as well as a low saturation is deteriorated due to mixing of the BK toner.

Figure 7:
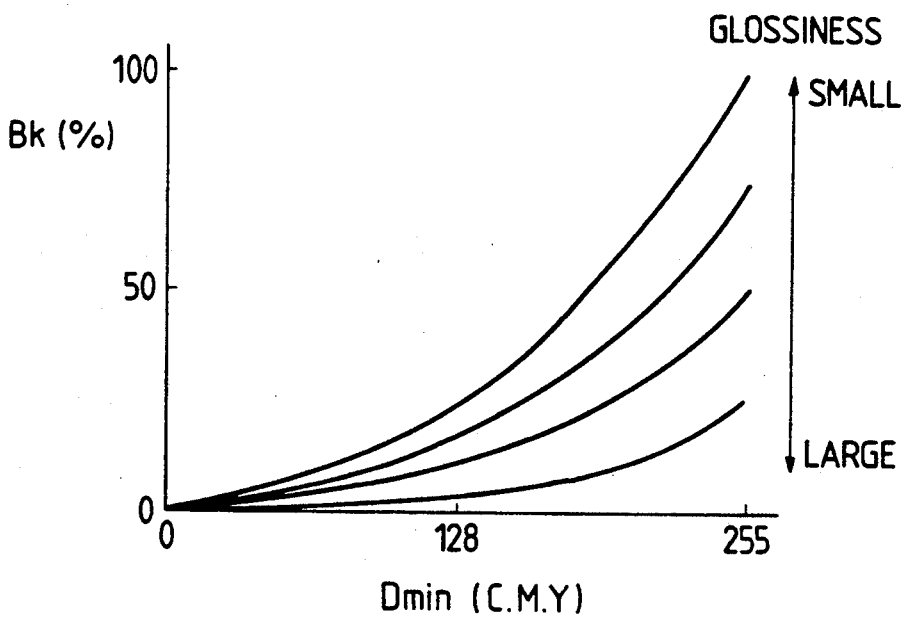
FIG. 7 illustrates UCR characteristics when the rate of black color generation is non-linearly changed with respect to the color density.

FIG. 7 illustrates the UCR characteristics realized by non-linearly determining the rate of black color generation.

The rate of black color generation is made to be low in a region in which the density level is low in such a manner that the rate of black color generation is determined in accordance with the following equation according to this embodiment:

$$D_{BK} = K \times D_{min}^2$$

where $D_{BK}$ is the BK density level, K is a coefficient and $D_{min}$ is the lowest density level among C, M and Y.

By enlarging coefficient K, the glossiness is lowered, while the glossiness is raised by reducing K.

As a result, color turbidity due to the BK toner in reproducing the color displaying high lightness and a low saturation can be prevented.

Specifically, setting was made such that the rate of black color generation became 50% when the value of $D_{min}$ was 255 in the UCR characteristics shown in FIGS. 6 and 7 and a full color copy of a Macbeth color chart was processed. As a result, color deviation $\Delta E^* = 7.4$ was realized in the linear UCR shown in FIG. 6. Color deviation $\Delta E^* = 4.1$ was realized in the non-linear UCR in FIG. 7. As a result, the color reproducibility was improved.

Although a quadratic function is employed as a function of downwards convex according to this embodiment, another function of downwards convex such as a cubic function and a logarithmic function may be employed in place of the quadratic function.

Each of the above-described UCR characteristics is stored in a ROM table so as to be accessed by the CPU or another hard circuit. However, another method may be employed which is arranged in such a manner that coefficient K is stored in the ROM and the UCR characteristics are obtained by calculations made by the CPU or the other hard circuit.

Then, the UCR process for each region of the original image will now be described.

Figure 8:
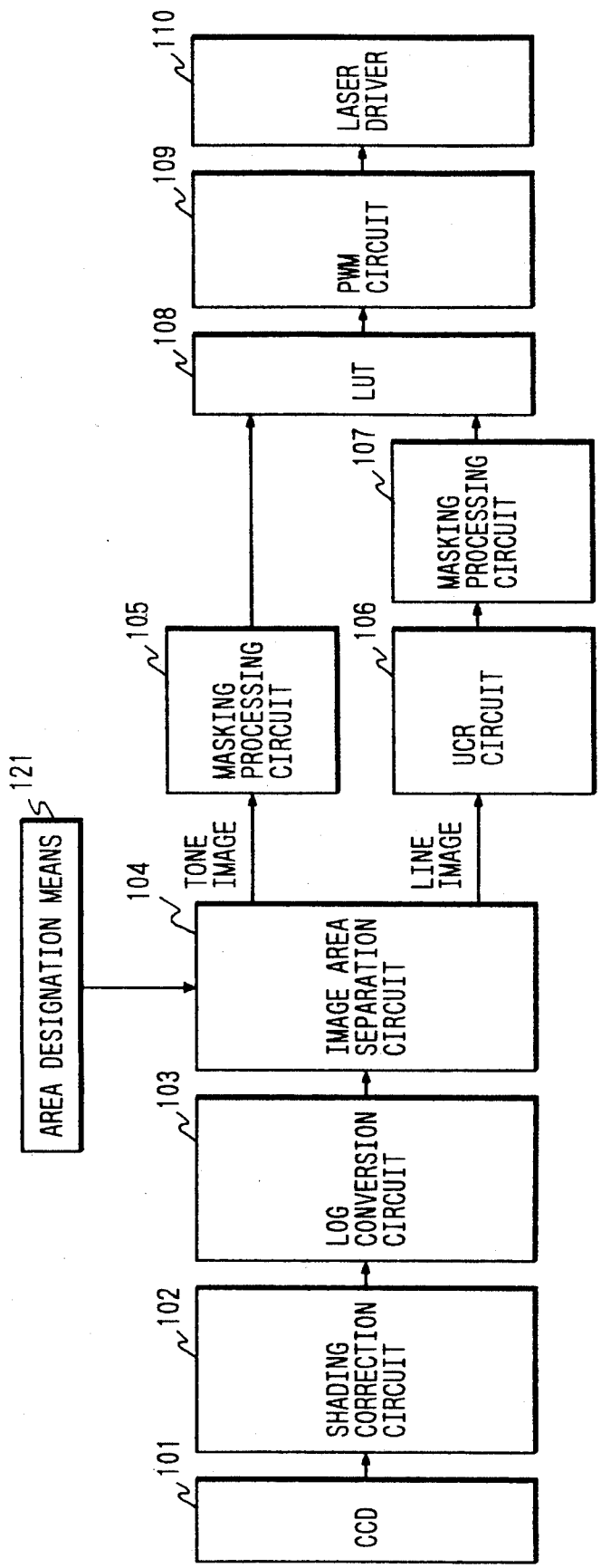
FIG. 8 is a block diagram which illustrates an image signal processing circuit according to a second embodiment of the present invention.

FIG. 8 is a block diagram which illustrates a signal processing operation for forming a digital full color image performed by the image forming apparatus according to the third embodiment of the present invention.

Referring to FIG. 8, reference numeral 110 represents a CCD and 102 represents a shading correction circuit for correcting scatter in the R (red), G (green) and B (blue) image brightness signals read by the CCD 101 between the light receipt cells of the CCD. Reference numeral 103 represents a LOG conversion circuit for converting the RBG brightness signals into C (cyan), M (magenta) and Y (yellow) image density signals. Reference numeral 104 represents an image separation circuit for selecting an image processing series in accordance with a tone image, which has been previously designated by a digitizer (area designation means) 121, and a region of a line image.

Reference numeral 105 represents a masking processing circuit for color-correcting the tone image signal in accordance with the output characteristics of the printer. Reference numeral 106 represents a UCR circuit for generating a BK (black) signal from the C, M and Y line image signals. Reference numeral 107 represents a masking processing circuit for color-correcting the line image signal by using a masking coefficient which is different from that for use in the masking processing circuit 105. Reference numeral 108 represents an LUT for correcting the tone image signal and the line image signal in accordance with the tone characteristics of the printer. Reference numeral 109 represents a PWM (Pulse Width Modulation) circuit for converting the pulse width of the signal to correspond to the image density for the purpose of obtaining a tone image of an area tone type Reference numeral 120 represents a laser driver for driving a laser in response to a pulse width signal supplied from the PWM 109 so as to form a latent image on the surface of the photosensitive member. The formed latent image is developed by using a toner so that a visible image is formed. The CCD 101, the shading correction circuit 102, the LOG conversion circuit 103, the PWM circuit 109 and the laser driver 120 are the same as those according to the structure shown in FIG. 3.

Figure 9:
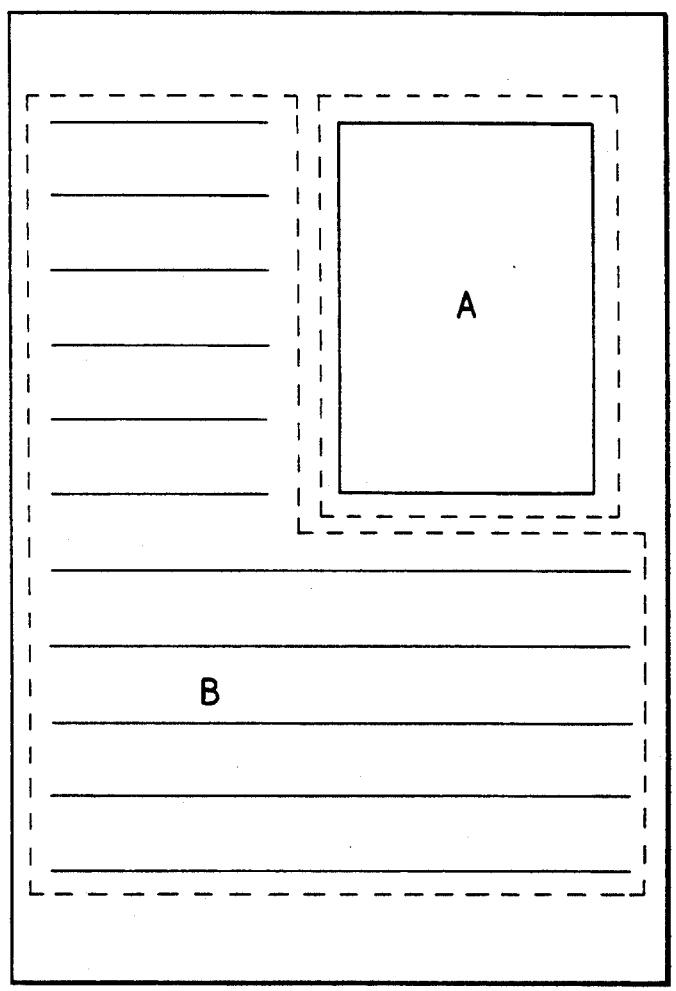
FIG. 9 illustrates an example of separating an image region of an original document.

According to this embodiment, the digitizer for use in a conventional copying machine acts to designate region A of the original document as a tone image region as shown in FIG. 9, while region B of the same is designated by a user as the line image region for characters or the like.

The operation will now be described.

The R, G and B image brightness signals read to the CCD 101 are subjected by a process in which scatter between the light receiving cells of the CCD 101 is corrected by the shading correction circuit 102. Then, the RGB brightness signals are converted into C, M and Y image density signals by the LOG conversion circuit 103. Then, the image separation circuit 104 selects the image processing series in accordance with the predetermined tone image and the line image region.

The region designated as the tone region is arranged in such a manner that the rate of black color generation is made to be 0%, that is, the same is not subjected to the UCR (Under Color Removal) but the same is color-corrected by the masking processing circuit 105. On the other hand, the region designated as the line image region is arranged in such a manner that the rate of black color generation (the quantity of under color removal) is made to be 100% by the UCR circuit 106 before it is color-corrected by the masking processing circuit 107.

After the masking process has been completed, both of the tone image signal and the line image signal are corrected so as to adapt to the tone characteristics of the printer by the LUT 108. Then, the same are converted into the pulse width signals which correspond to the image density for the purpose of obtaining a tone image in an area tone manner by the PWM 109. In accordance with the pulse width signal thus-obtained, the laser driver 120 drives the laser source. Laser beams emitted from the laser source are used to scan the surface of the photosensitive drum so that a latent image is formed. Then, the latent images are developed by the corresponding color toners in accordance with a conventional electrophotography process. The color toner images are transferred to the surface of the recording medium in a multiplied manner before the transferred images are fixed so that a full color image is formed.

As a result of forming the full color image by using the above-described toners, the fixing devices and the image processing means, the tone image region A was formed by the cyan, magenta and yellow toners each having substantially the same softening point. Therefore, the glossiness of the region A was made to be uniform. On the other hand, the line image region B including characters was formed by four color toners including the black toner the softening point of which is higher than the color toners by 10° C. or more. In particular, the glossiness of the black characters are reduced so that the characters could be easily read.

The image in the toner image region may be subjected to the UCR process in which the rate of black color generation is reduced similarly to the first embodiment so as to change the glossiness.

A fifth embodiment of the present invention is different from the fourth embodiment in the method of discriminating the image region. That is, although the same if discriminated by user according to the fourth embodiment, this embodiment is arranged in such a manner that the same is discriminated automatically.

The character/line images and the tone images are separated from one another by comparing the pixel patterns. That is, (1) The image signal transmitted from the LOG conversion circuit 103 is divided into blocks each of which is composed of 4×4 pixels.

(2) The pixels in the block are converted into binary values assuming that the average density of the image in the block is the binary threshold value.

(3) A comparison is made between the pattern of binary data in a plurality of adjacent blocks and a pattern previously stored in the ROM which easily appears in the character/line image. If there is a coincident pattern, a discrimination is made that the subject image in a plurality of the blocks is a character/line image. If there is no coincident pattern, a discrimination is made that the subject image is the tone image. The above-described discrimination may be made by the CPU. An example of the pattern is shown in FIG. 10.

Since the image separation is arranged to be automatically discriminated, the labor of a user can be reduced. Furthermore, the tone image displayed uniform glossiness and the glossiness of the black characters could be reduced among the characters of the character/line image. As a result, an image displaying excellent quality could be obtained.

Another structure may be employed which is arranged in such a manner that the image region separation in accordance with the user designation according to the fourth embodiment is also employed so as to be used when it is manually designated although the automatic discrimination is usually performed.

Furthermore, the image separation method is not limited to the above-described example and another conventional method may be employed.

Figure 11:
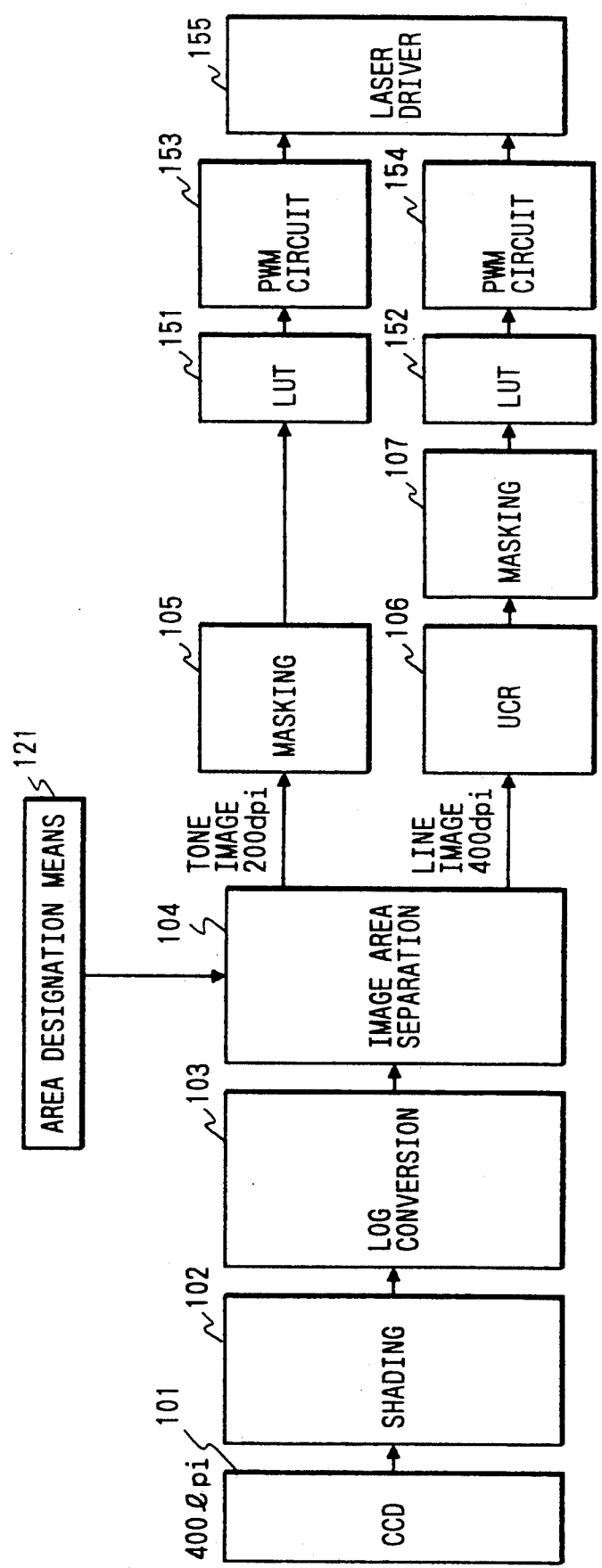
FIG. 11 is a block diagram which illustrates an image signal processing circuit according to a sixth embodiment of the present invention.

FIG. 11 illustrates a sixth embodiment of the present invention.

This embodiment is different from the fourth embodiment in the process to be performed after the image separation.

Figure 12:
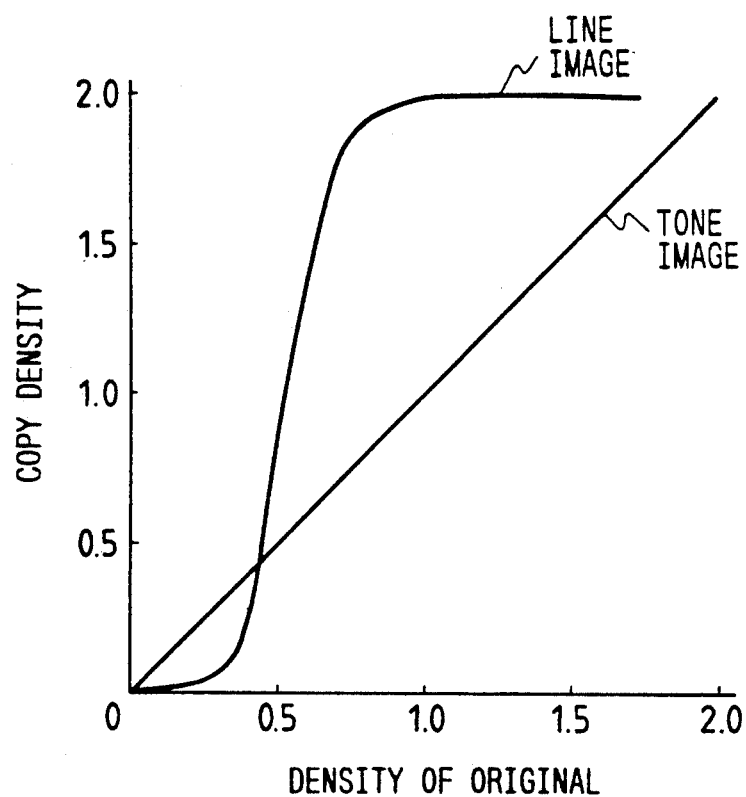
FIG. 12 illustrates an example of tone characteristics according to the sixth embodiment of the present invention.

According to this embodiment, the CCD 101 reads the image at 400 dpi (dot per inch) and the resolution of the region, which has been discriminated as the tone image, is raised to a high tone of 200 dpi. The tone image signal in this case is transmitted to a laser drive 155 via the masking processing circuit 105, the LUT 151 and a PWM circuit 153. The LUT 151 is set as designated in the tone characteristics shown in FIG. 12 in such a manner that the tone image in the tone image region becomes a straight line because a relationship $\gamma = 1$ is held.

On the other hand, the resolution of the region which has been discriminated as the line image is set to a high resolution of 400 dpi. The line image signal is transmitted to the laser driver 155 via the UCR 106, the masking processing circuit 107, the LUT 152 and the PWM circuit 154. The LUT 152 is set as designated as the tone characteristics shown in FIG. 12 in which the line image forms an S-curve.

As described above, the resolution is changed for the tone image and for the line image and as well as the tone characteristics are changed so that the tone image displayed a smooth gradation and uniform glossiness. On the other hand, the line image can be formed while exhibiting an excellent contrast of the fine portions, high resolution and reduced glossiness. Therefore, the overall image quality can be significantly improved.

Also the fourth embodiment may be arranged in such a manner that the tone image and the line image can be automatically discriminated from each other similarly to the fifth embodiment.

A seventh embodiment of the present invention will now be described.

Figure 13:
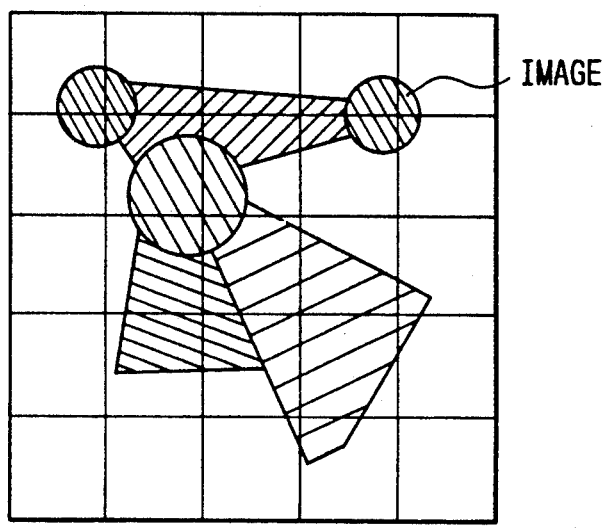
FIG. 13 illustrates an example of the separation of the original document region according to a seventh embodiment of the present invention.
Figure 14:
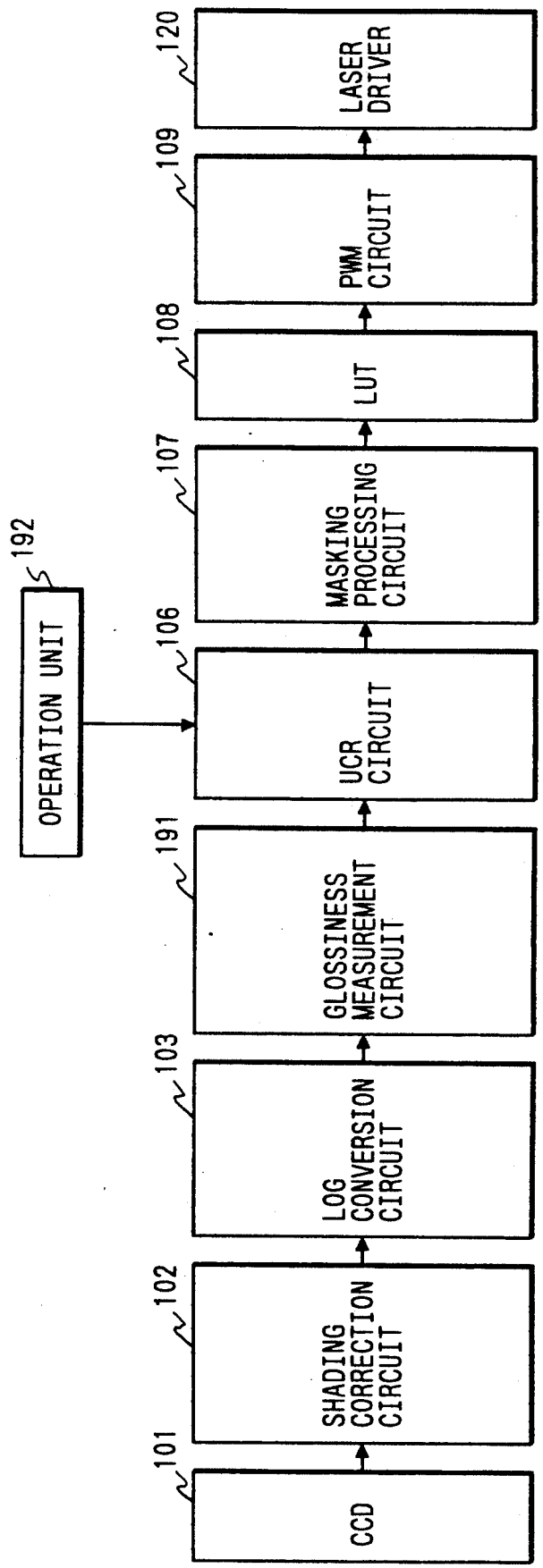
FIG. 14 is a block diagram which illustrates an image signal processing circuit according to a seventh embodiment of the present invention.

This embodiment is different from the second embodiment in the method of controlling the rate of black color generation. That is, according to this embodiment, an image is divided into, for example, 25 regions as shown in FIG. 13 and the glossiness of the image in each region is detected so that the rate of black color generation suitable for each region is selected. The glossiness of the image is detected by using a glossiness measuring circuit 191 as shown in FIG. 14. The glossiness measuring circuit 191 measures the glossiness of the image in each region by dividing the image signals for one line into regions and by using the image signal for a predetermined number of lines. The UCR circuit 106 determines the rate of black color generation for each region in accordance with the relationship between the rate of black color generation and the glossiness of the output image as shown in FIG. 5. According to this embodiment, glossiness further like that of the original document can be obtained and thereby an image exhibiting further excellent quality can be obtained. According to this embodiment, the glossiness for each region may be selected by a user similarly to the fourth embodiment. In addition, the region selection can, of course, be made variously in place of the above-described example.

Then, an embodiment in which the UCR process is changed in accordance with the characteristics of the recording medium will now be described.

Figure 15:
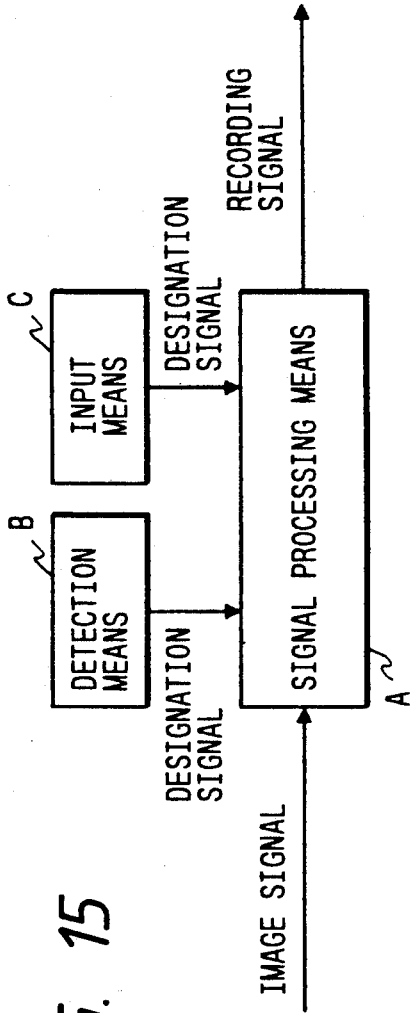
FIG. 15 is a block diagram which illustrates the basic structure of an eighth embodiment of the present invention.

FIG. 15 illustrates the basic structure of an eighth embodiment of the present invention. Referring to FIG. 15, symbol A represents a signal processing means for changing the calculating algorithm for converting an input image signal into recording signals of each hue in accordance with the designation signal denoting the characteristics or kind of the recording medium.

The signal processing means A varies the forming condition of a black recording signal in response to, for example, a designation signal. The above-described designation signal denotes, for example, whether or not the recording medium is transparent so that the signal processing means A varies the recording signal forming condition in accordance with whether or not the recording medium is transparent. Another example may be employed in which the designation signal designates the optical characteristics of the recording medium including information about the smoothness of the surface of the recording medium. Specifically, the above-described designation signal is a detection signal of a detection means B which detects the characteristics or the kind of the recording medium or a signal of an input means C which designates and receives the characteristics or the kind of the recording medium.

Figure 16:
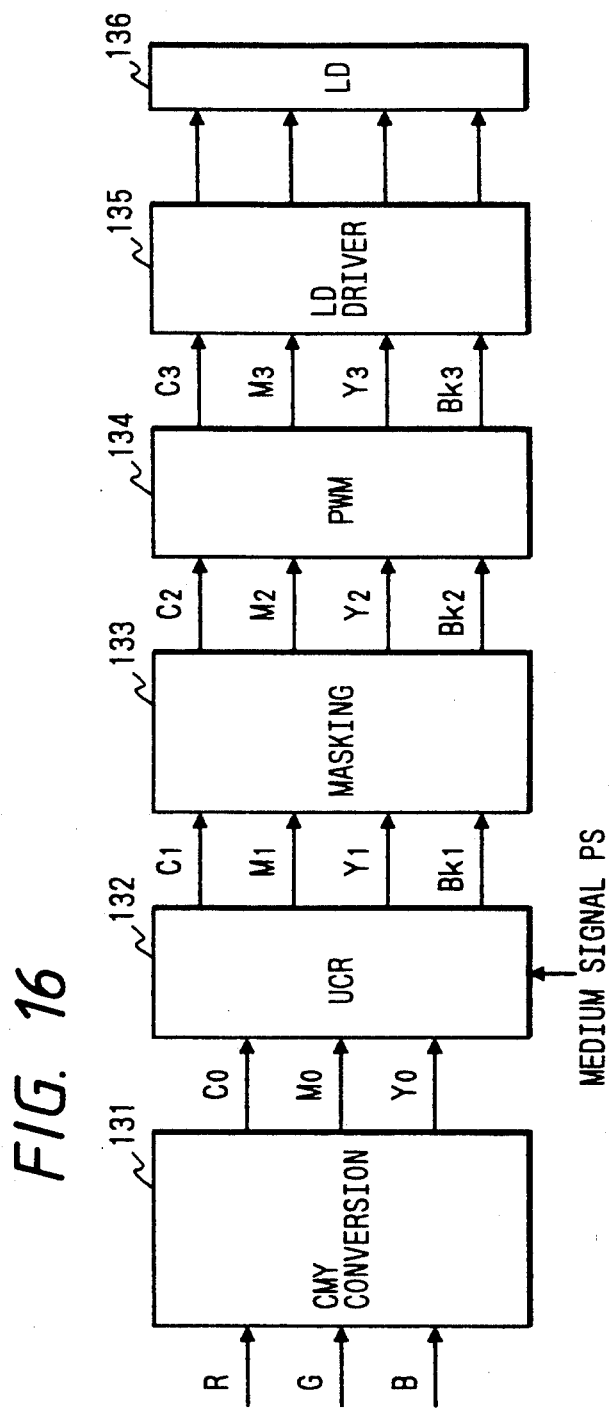
FIG. 16 is a block diagram which illustrates an image signal processing circuit according to the eighth embodiment of the present invention.

FIG. 16 illustrates the structure of an image processing circuit for converting R (red), G (green) and B (blue) signals into C, M, Y and BK recording signals, the R (red), G (green) and B (blue) signals being image information items about the original document read by the image sensor (for example, a photoelectrical conversion device such as a CCD sensor array) of the reading portion (image reading portion) 11 shown in FIG. 2.

Referring to FIG. 16, R, G and B input image signals are converted into $C_O$, $M_O$ and $Y_O$ density signals by a CMY conversion circuit 131. The density signals are supplied to a UCR (Under Color Removal) calculator 132 in which the density (the output level) of the BK signal is determined in accordance with a signal having the lowest density level among the $C_O$, $M_O$ and $Y_O$ density signals and a medium signal PS to be described later. Then, output signals $C_1$, $M_1$, $Y_1$ and $BK_1$ from the UCR calculator 132 are subjected to a predetermined masking process in a masking circuit 133 before a pulse width modulation process is performed in a PWM (Pulse Width Modulation) circuit 134. An output signal from the PWM circuit 134 is supplied to an LD driver 135 so that the laser diode (LD) 136 is driven.

Figure 17:
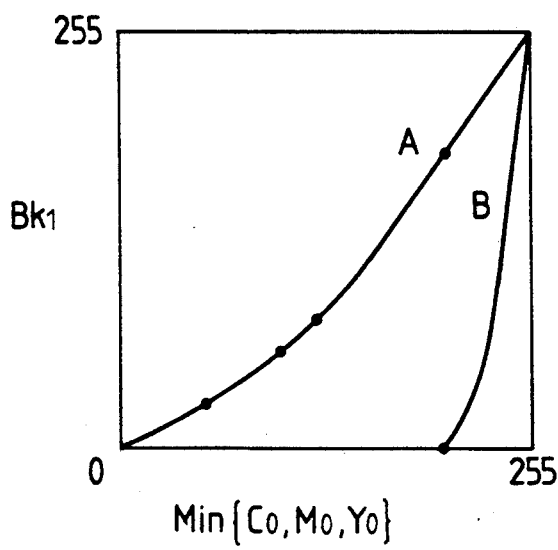
FIG. 17 is a graph which illustrates an example of output characteristics of the UCR calculator shown in FIG. 16.

FIG. 17 illustrates the characteristics of the calculating algorithm of the UCR calculator 132. That is, referring to FIG. 17, curve A shows the characteristic value which is selected in a case of an opaque medium such as ordinary wood free paper. The axis of abscissa stands for the level of a signal the density level of which is the lowest in a case where the density of the cyan, magenta, yellow density signals $C_O$, $M_O$ and $Y_O$ is expressed by 255 levels (gradation). The axis of ordinate stands for the density level of the BK (black) signal which is generated at the above-described case. On the other hand, curve B shows the characteristics value which is selected when an image is formed on a transparent recording medium, for example, a OHP sheet. The density level of the signal is lowered in comparison to that shown by the curve A.

Referring to FIG. 2, assumptions are made that the C, M and Y toners for use in the developing device 3 comprise a two-component developer and BK toner comprises a single component developer composed of a magnetic toner. Therefore, since the BK toner has insufficient transparency, the quantity of the BK toner must be considerably reduced in a case where an image is formed on the OHP sheet in comparison to a case where an image is formed on plain paper. The reason for this lies in that the image formed by the BK toner display a small quantity of transmissive light.

Therefore, whether or not the recording medium is detected in accordance with the output from an optical sensor immediately after the same has been supplied from the paper tray and the result of the detection is transmitted as medium signal PS to the UCR calculator 132. The UCR calculator 132 performs the UCR calculation of the output characteristics as shown in FIG. 17 in response to the medium signal PS. For example, data as shown in FIG. 17 is previously stored in an internal memory (omitted from illustration) of the UCR calculator 132. A black data signal $BK_1$ is transmitted from the internal memory (look-up memory) in response to the medium signal PS and in accordance with the minimum value of the density signals $C_O$, $M_O$ and $Y_O$. As described above, since the output characteristics are switched over in response to the medium signal PS, a recorded image exhibiting excellent quality can always be obtained even if the kind or the characteristics of the recording medium are changed.

A signal exhibiting excellent quality is also obtained by arranging the structure in such a manner that the UCR calculator 132 shown in FIG. 16 does not transmit the BK signal in a case where a transparent recording medium is used. Another structure may be employed which is arranged in such a manner that a conventional black character extraction circuit (omitted from illustration) is connected between the CMY conversion circuit 131 and the UCR calculator 132 shown in FIG. 16 and the black character extraction circuit recognizes a black character region so as to transmit the BK signal denoting only the recognized black character portion. Also in this case, an image exhibiting further high quality can be obtained.

In a case where the surface smoothness of the recording medium is different, the image quality as well becomes different. That is, in a case where a recording medium having an excellent surface smoothness and a high light-reflectance is used, light easily penetrates the toner present on the recording medium, reflected on the surface of the recording medium and again penetrates the toner. Therefore, if the transparency of the toner is low in a case where the surface smoothness is high, the output image becomes too dark or the saturation deteriorates.

Accordingly, a structure is employed in which a manipulation button (omitted from illustration) for selecting and designating the surface smoothness of the recording medium is provided on the manipulating panel (omitted from illustration) of the copying machine. In accordance with the designated surface smoothness, the characteristics of the curve B shown in FIG. 17 are selected by the UCR calculator 132 in a case where the recording medium has a high surface smoothness so that the BK toner displaying insufficient transparency is not used as possible. As a result, an image exhibiting excellent quality can be formed.

Figure 18:
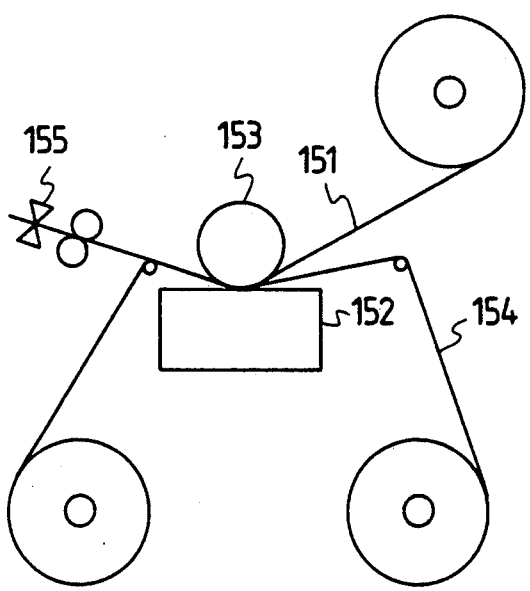
FIG. 18 is a plan view which illustrates the schematic structure of an essential portion of the image forming apparatus according to another embodiment of the present invention.

The present invention can be applied to not only the laser beam recording apparatus but also to, for example, a thermal transfer recording apparatus. FIG. 18 illustrates the structure of an essential portion of a thermal transfer recording apparatus. A roll paper shape recording medium 151 is supplied between a thermal head 152 and a confronting roll 153 so that a coloring material of a color thermal transfer ribbon 154 is transferred to the recording medium 151 before it is cut into a sheet shape. Also according to this example, the BK (black) coloring material has bad transparency. Therefore, the above-described UCR calculation is performed by the UCR calculator 132 so that an image exhibiting excellent quality is obtained.

Although the above-described embodiment is arranged in such a manner that the calculating algorithm for the UCR is changed in a case where the transparency of the BK coloring material is inferior to that of the other coloring materials, the present invention is not limited to this. Another structure may be employed in which the calculating algorithm for the masking operation is also changed in addition to the change of the calculating algorithm of the UCR to adapt to the transparency of the C, M and Y coloring materials or the optical characteristics of the recording medium, resulting an improvement in the image quality.

A similar effect can be obtained by changing the scanning density on the calculating algorithm in a case of an apparatus in which an optical scan is performed by using laser beams.

Furthermore, the present invention may, of course, be adapted not only to the recording apparatus but also to a display apparatus which uses a coloring agent such as the electrophotographic display apparatus.

It is preferable that a structure be employed in which a plurality of characteristics corresponding to the curve B shown in FIG. 17 are provided so as to be arbitrarily selected through a manipulating button. In this case, an image output of a desired color by a user can be obtained.

The recording medium is not limited to the OHP film but a semitransparent back print film or the like may be employed to obtain a similar effect.

The color development order in each of the above-described embodiments will now be described. As described above, the quality of the image will be deteriorated if the image is formed in such a manner that the black toner having low glossiness is positioned at the uppermost layer. Accordingly, the black toner is arranged to be positioned at the lowest layer in order to improve the quality of the formed image. An embodiment arranged in this manner will now be described.

Figure 19:
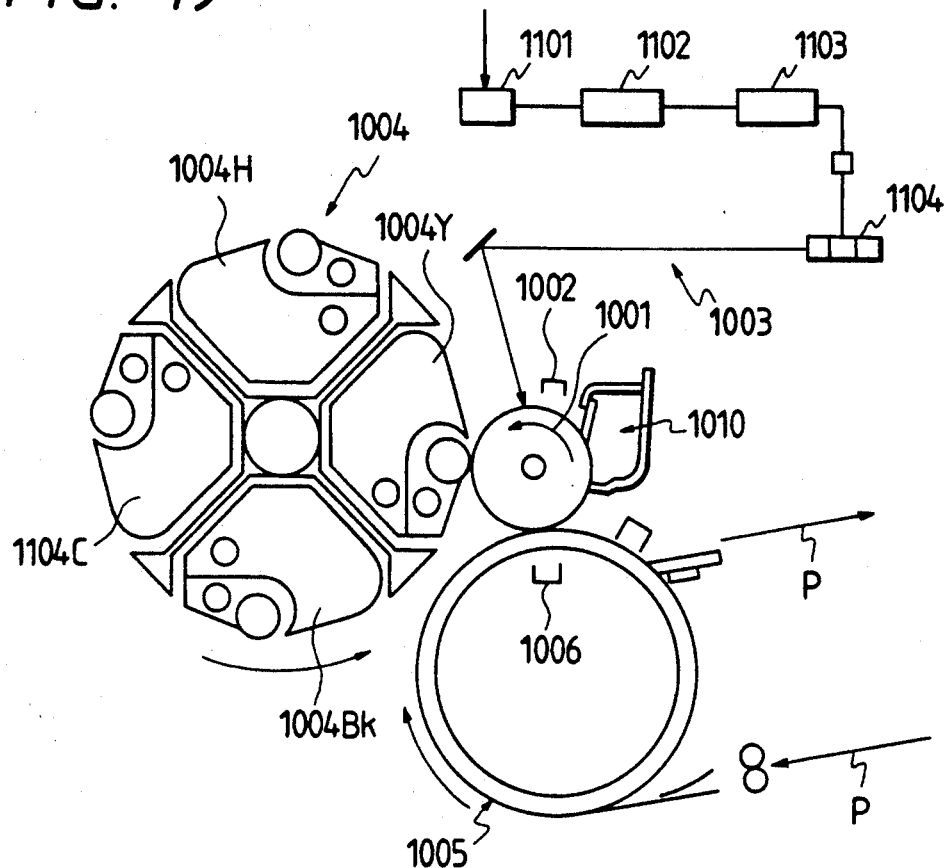
FIG. 19 is a cross section structural view which illustrates an embodiment of a color image forming apparatus.

Referring to FIG. 19, this embodiment is arranged in such a manner that an image carrier 1001 serving as an electrophotography photosensitive drum is held in such a manner than it can be rotated in a direction as designated by an arrow. The same is uniformly charged by a charger 1002 before an optical image is irradiated on the photosensitive drum 1001 by a laser beam exposure means 1003 so that an electrostatic latent image is formed.

The exposure means 1003 will be described in detail. The exposure means 1003 receives CMYBK color decomposition density signals, which are the output signals from a color image input apparatus and a color image processing apparatus (omitted from illustration). The CMYBK digital image signals are respectively digital/analog converted by a D/A converter 1101 before the same is voltage/time converted by a V/T converter 1102. Then, it is supplied to a laser driver 1103. The laser emitting time is adjusted in response to the image signal and the electrostatic latent images corresponding to the image signals are formed on the photosensitive drum 1001 by a laser scanning optical system comprising a collimator lens and a rotational polygonal mirror 1104.

The latent image thus formed is developed and made to be a visible image by an arbitrary developing device, a yellow developing device 1004Y in a case shown in FIG. 19, selected from four developing devices fastened to a rotational developing device, that is, a yellow developing device 1004Y, a magenta developing device 1004M, a cyan developing device 1004C and a black developing device 1004Bk. The visible image (toner image) thus-developed is, by a transfer charger 1006, transferred to recording paper P which is electrostatically absorbed onto a transfer drum 1005.

On the other hand, the photosensitive drum 001 is subjected to a residual toner removal operation performed by a cleaning means 1010 before it is subjected to a next image forming process.

By performing similar operations, toner images are formed on the photosensitive drum 1001 so that the second, the third and the fourth toner images are transferred onto the same recording paper P in a layered manner. The recording paper P on which the same are formed in the layered manner is separated from the transfer drum 1005 by a separation charger 1007 before it is discharged outside the apparatus via a fixing device (omitted from illustration).

According to the present invention, the above-described color image forming process is sequentially performed starting from the color which displays the lowest surface glossiness when an image is formed by the same quantity. That is, assuming that the black (Bk), the cyan (C), the magenta (M) and yellow (Y) toners have lower glossiness in this sequential order, the rotational developing device 1004 is, as shown in FIG. 19, arranged in such a manner that the black developing device 1004Bk, the cyan developing device 1004C, the magenta developing device 1004M and the yellow developing device 1004Y are disposed in a direction of rotation. Therefore, forming of the black (Bk) latent image is commenced on the photosensitive drum 1001 before the cyan (C), magenta (M) and yellow (Y) latent images are sequentially formed. Also in a case of a horizontally moving type developing device, the black developing device, the cyan developing device, the magenta developing device and the yellow developing device are arranged in this order.

It should be noted that a method based on, for example, "JIS (Japanese Industrial Standard)-Z8741 (60° method)" can be available as a measurement method of the glossiness.

Figure 20A:
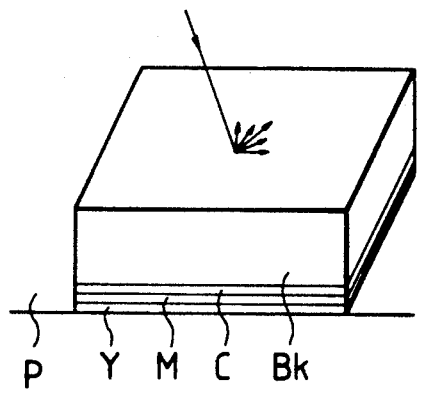
FIGS. 20A and 20B illustrate a state in which colors of formed images are mixed with each other after a color image has been formed.
Figure 20B:
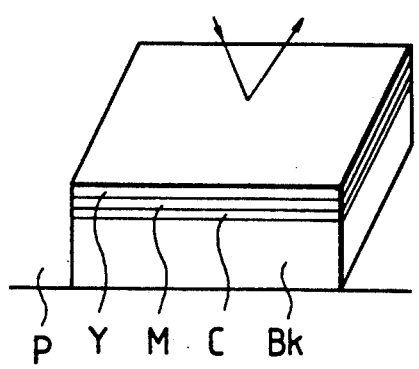

FIGS. 20A illustrates a state in which images (toner images) thus-formed are color-mixed. FIG. 20B microscopically illustrates the state in which the toners are color-mixed when an achromatic color (gray) is reproduced. Referring to the drawings, the achromatic color is reproduced by mixing a black toner and a little quantity of CMY toners in such a manner that black color is generated and the under color is removed by the skeleton black method.

In either of the methods shown in FIGS. 20A and 20B, the same color is reproduced by mixing the cyan (C), the magenta (M), the yellow (Y) and the black (Bk) toners. However, in the method shown in FIG. 20A, the yellow (Y), the magenta (M), the cyan (C) and the black (Bk) toners are layered in this sequential order from the lowest layer of the drawing sheet. On the other hand, in the method shown in FIG. 20B, the black toner (Bk) is placed at the lower layer and the other toners are layered on it.

In the above-described case shown in FIG. 20A in which the toners are layered, the black (Bk) toner is present on the surface of the image because it is not sufficiently dissolved after the fixing process has been completed. Therefore, small uneven portions are formed on the surface of the image, causing light made incident upon the surface of the image to be diffused and thereby the glossiness to be lowered. In the case shown in FIG. 20B, the black (Bk) toner is disposed in the lower layer and the other color toners are layered on it. Furthermore, the color toner layers are formed on the fixed black toner. Therefore, the surface of the image can be made to be smooth, causing the glossiness of the surface of the formed image to be the same as the glossiness realized by a single color toner.

According to this embodiment, the following toners are employed:

Black toner: a toner composed of 100 parts by weight of main binder of a polyester type the number average molecular weight of which is about 10000, 5 parts by weight of carbon black, 4 parts by weight of charge controller (hereinafter called a "CA agent") and an additive.

Yellow toner: a toner composed of 100 parts by weight of main binder of a polyester type the number average molecular weight of which is about 3500, 5 parts by weight of C.I. pigment yellow 17, 4 parts by weight of the CA agent and an additive.

Magenta toner: a toner composed of 100 parts by weight of main binder of a polyester type the number average molecular weight of which is about 3500, 4 parts by weight of C.I. Melvent red 49, 0.7 parts by weight of dyestuff C.I. pigment red 122, 4 parts by weight of the CA agent and an additive.

Cyan toner: a toner composed of 100 parts by weight of main binder of a polyester type the number average molecular weight of which is about 3500, 5 parts by weight of phthalocyanine pigment, 4 parts by weight of the CA agent and an additive.

The image forming test was performed by using a developer prepared by mixing the above-described four kinds of the toners with magnetic carrier particles.

FIG. 21 illustrates a color image forming apparatus arranged in accordance with a plural drum system according to another embodiment of the present invention.

According to this embodiment, photosensitive drums 2001 (2001BK, 2001C, 2001M and 2001Y) comprising image carriers are disposed to the corresponding color image forming processes. Similarly to the above-described embodiments, chargers 2002 (2002BK, 2002C, 2002M and 2002Y), laser beam exposure means 2003 (2003BK, 2003C, 2003M and 2003Y) and developing devices 2004 (2004BK, 2004C, 2004M and 2004Y) are disposed around the photosensitive drum 2001 so that color images are formed. The color images formed on the photosensitive drums 2001BK, 2001C, 2001M and 2001Y are transferred to recording paper P which is conveyed by a transfer belt 2005 before they are fixed by a fixing device 2011 and then the recording paper P is discharged outside from the apparatus. On the other hand, the residual toners on the photosensitive drums 2001 (2001B, 2001C, 2001M and 2001Y) are removed by cleaning means 2010 (2010BK, 2010C, 2010M and 2010Y).

As described above, according to the present invention, the image forming is commenced from the black (BK) toner having the lowest glossiness before the cyan (C), the magenta (M) and the yellow (Y) toner images are sequentially formed. As a result, a similar effect to that obtainable from the above-described embodiment can be obtained.

Although each of the above-described embodiments is arranged in such a manner that the non-magnetic toner is used, a magnetic toner containing a magnetic material such as magnetite in its toner binder may be used.

Since magnetite is an insoluble material, a high melting point is usually displayed by the magnetic toner containing it. Furthermore, magnetite powder forms fine uneven portions on the fixed image, the glossiness of the surface of the formed image is significantly reduced because incidental light is easily diffused and reflected. Therefore, a further significant effect can be obtained in a case where the present invention is adapted to the magnetic toner.

According to this embodiment, an image exhibiting excellent quality can be formed by the jumping development method which uses a single magnetic component while using a toner composed of 100 parts by weight of main binder of a polyester type the number average molecular weight of which is about 3500, 60 parts by weight of magnetite, 2 parts by weight of the CA agent and an additive.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A color image processing apparatus comprising:
   input means for inputting a plurality of color component signals;
   under color processing means for processing an under color of each of a plurality of said color component signals supplied by said input means; and
   control means for changing the glossiness of an output image by controlling the quantity of said under color process performed by said under color processing means.

2. A color image processing apparatus according to claim 1, wherein said under color processing means processes said under color in accordance with the density of each of a plurality of said color component signals.

3. A color image processing apparatus according to claim 2, wherein said under color processing means substitutes a portion of a plurality of said color component signals by another color component signal.

4. A color image forming apparatus comprising:
   input means for inputting image signals denoting a plurality of color components;
   under color processing means for processing the under colors of said image signals denoting a plurality of said color components supplied by said input means;
   image forming means for forming images in response to said image signals denoting a plurality of said color components, which have been processed by said under color processing means, and image signals denoting said under colors by using coloring agents which correspond to a plurality of said color components and said under colors, said coloring agents, which correspond to said under colors, having glossiness lower than that of said coloring agents which correspond to a plurality of said color components; and
   control means for controlling the glossiness of said image formed by said image forming means by controlling the quantity of process of said under colors processed by said under color processing means.

5. A color image forming apparatus comprising:
   input means for inputting image signals denoting magenta, cyan and yellow color components;
   a processing circuit for extracting an image signal, which denotes a black color component, from said image signals denoting said magenta, cyan and yellow color components supplied by said input means to output it and as well as transmitting image signals denoting said magenta, cyan and yellow color components after said image signal denoting said black color component has been extracted;
   a plurality of developing devices respectively having magenta, cyan, yellow and black coloring agents, said black coloring agent having the glossiness which is lower than that of each of said magenta, cyan, yellow coloring agents;
   image forming means for forming color images by means of a plurality of said developing devices in accordance with said image signals respectively denoting said magenta, cyan, yellow and black color components transmitted from said processing circuit; and
   control means for changing the glossiness of a color image formed by said image forming means by controlling the density of said image signal denoting said black color component extracted by said processing means.

6. A color image forming apparatus according to claim 5, wherein said magenta, cyan and yellow coloring agents are toners each having a melting point which is lower than that of said black coloring agent.

7. A color image forming apparatus according to claim 5, wherein said black coloring agent is a magnetic toner.

8. An image forming apparatus comprising:
   a first developing device including a first developer;
   a second developing device including a second developer the glossiness of which is lower than that of said first developer;
   input means for inputting an image signal;
   image forming means for forming images by using said first and second developing devices in response to said image signal supplied by said input means; and
   control means for changing the glossiness of said image formed by said image forming means by controlling the quantity of said second developer to be used.

9. A color image forming apparatus comprising:
   output means for transmitting image signals respectively denoting a plurality of color components;
   a plurality of coloring agents corresponding to a plurality of said color components, at least one of a plurality of said coloring agents having the glossiness which is lower than that of each of the other coloring agents; and
   image forming means for forming a color image by sequentially stacking a plurality of said coloring agents in response to said image signals respectively denoting a plurality of said color components transmitted from said output means, wherein said image forming means stacks a plurality of said coloring agents in such a manner that a coloring agent having lower glossiness is placed at any of the layers except for the uppermost layer.

10. A color image forming apparatus comprising:

output means for transmitting image signals respectively denoting magenta, cyan, yellow and black color components;

a plurality of developing devices respectively including magenta, cyan, yellow and black toners, said black toner having the glossiness which is lower than that of each of the other toners; and image forming means for forming a color image by sequentially stacking said toners on the same recording medium in response to said image signals denoting said color components transmitted from said output means, wherein said image forming means transfers first said black toner to said recording medium.

11. A color image forming apparatus according to claim 10, wherein said black toner is a magnetic toner.

12. A color image forming apparatus according to claim 10, wherein a plurality of said developing devices are arranged in a line in such a manner that said developing device including said black toner is disposed at a terminative position.

13. A color image forming apparatus according to claim 12, wherein a plurality of said developing devices are arranged in the order of black, magenta, cyan and yellow.

14. A color image forming apparatus according to claim 10, wherein a plurality of said developing devices are integrally rotatably disposed in such a manner that black, magenta, cyan and yellow developing devices are arranged in this order along the rotational direction.

15. A color image forming apparatus according to claim 10, further comprising a plurality of photosensitive members which correspond to a plurality of said developing devices in such a manner that a photosensitive member which corresponds to said developing device including said black toner is disposed at the most upstream position relative to a direction in which said recording medium is conveyed.

* * * * *

UNITED STATES PATENT AND TRADEMARK OFFICE
CERTIFICATE OF CORRECTION

PATENT NO. : 5,162,860

DATED : November 10, 1992

INVENTOR(S) : Yasuo NAMI, et al.

It is certified that error appears in the above-identified patent and that said Letters Patent is hereby corrected as shown below:

COLUMN 3:

Line 67, "be" should be deleted.

COLUMN 6:

Line 52, "tot he" should read --to the--.

COLUMN 9:

Line 24, "type" should read --type.--.

COLUMN 13:

Line 2, "display" should read --displays--.

COLUMN 14:

Line 16, "ing" should read --ing in--.

UNITED STATES PATENT AND TRADEMARK OFFICE
CERTIFICATE OF CORRECTION

PATENT NO.  : 5,162,860

DATED       : November 10, 1992

INVENTOR(S) : Yasuo NAMI, et al.

It is certified that error appears in the above-identified patent and that said Letters Patent is hereby corrected as shown below:

<u>COLUMN 15</u>:

Line 10, "drum 001" should read --drum 1001--.

Signed and Sealed this

Twenty-third Day of November, 1993

Attest:

BRUCE LEHMAN

Attesting Officer   Commissioner of Patents and Trademarks